United States Patent [19]
Abrams et al.

[11] Patent Number: 6,023,960
[45] Date of Patent: Feb. 15, 2000

[54] METHOD AND APPARATUS FOR GENERATION OF TEST BITSTREAMS AND TESTING OF CLOSED LOOP TRANSDUCERS

[75] Inventors: Michael L. Abrams, Houston; Ben W. Jones, Austin; Franklin W. Mayo, Houston; Scott T. Dupuie, Buda; Jeffery C. Gannon, Austin; Richard A. Johnson, Buda, all of Tex.

[73] Assignee: I/O Sensors, Inc., Austin, Tex.

[21] Appl. No.: 09/304,421

[22] Filed: Apr. 28, 1999

Related U.S. Application Data

[62] Division of application No. 08/992,663, Dec. 17, 1997.

[51] Int. Cl.$^7$ .................................... G01C 17/38
[52] U.S. Cl. ................................................ 73/1.01
[58] Field of Search ...................... 73/1.01, 1.37

[56] References Cited

U.S. PATENT DOCUMENTS

| | | |
|---|---|---|
| 4,922,756 | 5/1990 | Henrion . |
| 5,060,504 | 10/1991 | White et al. ............................... 73/1.38 |

OTHER PUBLICATIONS

"Digital Summation of Delta Modulation Signals", Lawrence J. Engel and William Steenart, Department of Electrical Engineering, University of Ottawa, pp. 245–248.

"Analog Signal Generation for Built–In–Self–Test of Mixed–Signal Integrated Circuits", Gordon W. Roberts and Albert K. Lu, 1995, Kluwer Academic Publishers, Norwell, Massachusetts, pp. 33–51.

"A Built–In–Self–Test Scheme for a SNR, Gain Tracking, and Frequency Response Test of a Sigma–Delta ADC", Michael F. Toner and Gordon W. Roberts, IEEE, 1995, vol. 42, No. 1, pp. 1–15.

"Accelerometer Systems with Self–testable Features", Henry V. Allen, Stephen C. Terry and Diederik W. De Bruin, Sensors and Actuators, 20, 1989, pp. 153–161.

"The Effect of Geophone Tolerances on the Fidelity of the Total Seismic System" Halliburton Geophysics Services Inc., 1990.

"A Practical Set of Guidelines for Geophone Element Testing and Evaluation", A.L. Hagedoorn, E.J. Kruithof and P.W. Maxwell, First Break, vol. 6, No. 10, 1988.

"Testing The Performance of Delta–Sigma ADCs", A.R. El–Koubysi, Y. Guo, M.S.P. Lucas, EECE Dept., Kansas State University, KS, IEEE, 1992, pp. 514–517.

"Theory and Practical Implementation of a Fifth–Order Sigma–Delta A/D Converter", R.W. Adams, et al., J. Audio Eng. Soc., vol. 39, No. 7/8, Jul./Aug. 1991, pp. 515–528.

"On the Use of Windows for Harmonic Analysis with the Discrete Fourier Transform", F. H. Harris, Proc. of the IEEE, vol. 66, No. 1, Jan. 1978, pp. 51–83.

"Oversampling Methods for A/D and D/A Conversion", J.C. Candy and G.C. Temes, IEEE Press, 1991, pp. 1–29.

"High–Order Topology for Interpolative Modulators for Oversampling A/D Converters", W. I. Lee, et al., IEEE Trans. Circuits and Systems, vol. 37, No. 3, Mar. 1990.

*Primary Examiner*—Robert Raevis
*Attorney, Agent, or Firm*—Gary L. Bush; Mayor, Day, Caldwell & Keeton L.L.P.

[57] ABSTRACT

A high performance method and apparatus for testing a closed loop transducer is disclosed. A test bitstream signal is combined with a $\Sigma\Delta$ feedback bitstream of the transducer to produce a combined bitstream which is converted to a physical feedback to the sensor of the transducer. The $\Sigma\Delta$ bitstream output of the transducer is recorded for later analysis so as to test characteristics of the transducer. The test bitstream signal is preferably an oversampled, pulse density modulated signal. A testing arrangement is provided which is based upon the storage of short-length test patterns which are repetitively accessed to form a continuous test pattern. The test bitstream provided by the method of the invention produces very low noise and low distortion test signals where a repetitive test pattern is equivalent in length to one period of the test signal.

3 Claims, 11 Drawing Sheets

METHOD AND APPARATUS FOR GENERATION OF TEST BITSTREAMS AND TESTING OF CLOSED LOOP TRANSDUCERS

This application is a Divisional of Parent Ser. No. 08/992,663, filed Dec. 17, 1997.

BACKGROUND OF THE INVENTION

1. Field of the Invention

This invention relates generally to the field of testing transducers, such as accelerometers, and relates in particular to methods and apparatus for in-situ testing of a closed loop transducer, more particularly, an accelerometer used in a seismic data acquisition system. Still more particularly the invention relates to a method for generating a test bitstream for in-situ testing of a closed loop transducer having an Analog-to-Digital Converter which includes a $\Sigma\Delta$ modulator.

2. Description of the Prior Art

It is known to test a sensor by applying a physical input to it. For example, a conventional geophone includes a coil which can move in a magnetic field. Movement of the coil causes a current to flow in the coil. As a result, a voltage is developed across an input impedance. Thus, physical shaking of the geophone produces an output signal, and a test shaker could be used to test and characterize geophones.

The method of physically shaking transducers is not suited to mass manufacturing of certain transducers, such as geophones. Physical shaking is impractical to use in-situ where a geophone is placed in a remote location for recording geophysical signals characteristic of acoustic reflections from earth strata.

Electrical testing techniques for in-situ testing of geophones are known. Such tests apply analog signals, e.g., a test current, to flow in the moving coil of the geophone. A back EMF or voltage is produced across the coil in response. The test signal is the analog current applied to the coil; the measured signal is the back EMF voltage produced across the output impedance of the coil.

Prior methods and apparatus for in-situ electrical testing of a transducer, e.g., a geophone, have required separate test hardware which is located near the transducer for optimum performance. In one prior art system e.g., the I/O System Two data acquisition is system, an analog test signal is applied into the field coil of each geophone. Such analog signal is generated in a module including a Digital Look Up Table which produces a word signal of 10 to 20 bits. A Digital to Analog Converter (DAC) and an optional filter for the test analog signal are employed for applying the analog signal to one or more geophones. An alternative module includes a digital Sigma Delta Sigma ($\Sigma\Delta$)modulator which produces a one bit word, a one bit DAC and an optional filter for the test analog signal applied to one or more geophones.

Another class of transducers exists in the form of micromachined accelerometers with capacitive or piezoresistive sensing elements. For mass production applications such as the automotive industry, a go/no-go self test is normally required. One prior electrical technique has been to input a predetermined current through an on-chip element. Such current causes motion of the seismic mass which is detected as an output. Such prior art method for testing micromachined accelerometers is not a high performance method of testing. The term high performance in this context is the use $\Sigma\Delta$ modulators to produce a pulse density modulated signal.

Open loop accelerometers (the most common type) are not easily tested with a high performance electrical drive signal.

Prior physical tests of micromachined accelerometers include a "tumble test" where an accelerometer is placed in the earth's gravitational field, and an output is measured as a function of the accelerometer's orientation in the gravitational field. Alternatively, a physical test of a micromachined accelerometer can take the form of a shaker input and a measured output.

The prior art has provided for testing of Sigma Delta modulators per se. Self tests of such $\Sigma\Delta$ modulators have included providing a digital bitstream to the modulator which is then converted to an analog signal for high performance testing of the A/D converter. A one-bit DAC and an optional filter are provided. Various methods for placement of the test circuitry on the micromachined accelerometer have been devised.

There is a certain class of accelerometers which include a micromachined sensor with a closed loop feedback signal which is generated by a $\Sigma\Delta$ modulator. An example of such accelerometer is disclosed in U.S. Pat. No. 4,922,756 which issued on May 8, 1990 to the assignee of this application. Sigma Delta ($\Sigma\Delta$)modulation based A/D converters are used as an alternative to conventional A/D converters. Sigma Delta ($\Sigma\Delta$)modulation uses oversampling and one-bit quantization to achieve high resolution A/D conversion at a lower rate.

Identification of Objects of the Invention

A primary object of the invention is to provide a digital method for in-situ testing of a closed loop transducer with a Sigma Delta ($\Sigma\Delta$)feedback loop.

Another object of the invention is to provide a sensor based closed loop transducer arrangement which has a digital timing pattern where the feedback forcing time segments are split up: one for normal non-testing force feedback to the sensor and a second for forcing the sensor up or down according to an injected test bit of a test bitstream.

Another object of the invention is to provide a method for generating a test bitstream for testing a high performance closed loop Sigma Delta ($\Sigma\Delta$)based transducer system.

Another object is to provide a method for repetitively using short-length test patterns to generate a continuous test bitstream for testing a Sigma Delta ($\Sigma\Delta$) modulator based transducer system.

SUMMARY OF THE INVENTION

The objects identified above as well as other advantages and features of the invention are incorporated in a transducer having a sensor and a closed loop feedback circuit. In a preferred embodiment, the invention is incorporated in a transducer which includes a sensor such as a mass suspended from a support frame. Circuitry is provided in such transducer for generating a displacement signal representative of displacement of the mass from a reference position with input to a support structure. A forward circuit is provided which is responsive to the displacement signal for converting the displacement signal to an output binary bitstream. A $\Sigma\Delta$ modulator in the forward circuit in combination with a comparator produces a one-bit $\Sigma\Delta$ modulated output binary bitstream. The $\Sigma\Delta$ modulator/comparator serves as a high performance Analog-to-Digital Converter (ADC). A feedback arrangement is provided which is responsive to the one-bit $\Sigma\Delta$ output binary bitstream for generating a binary force on the mass in a direction tending to restore the mass to its reference position.

The invention includes a method and apparatus for combining with the one-bit $\Sigma\Delta$ modulated feedback signal a special purpose one-bit $\Sigma\Delta$ modulated test signal which acts as a precision forcing signal on the mass of the sensor. When such test bitstream is inserted into the feedback circuit, the transducer forward circuit senses the test signal as an external force applied to the transducer which must be zeroed (nulled or canceled) by the transducer feedback loop. In other words, a one-bit $\Sigma\Delta$ modulated signal is produced by the forward $\Sigma\Delta$ modulator (output of the forward ADC). According to the invention the test bitstream is preferably injected into or combined with the one-bit $\Sigma\Delta$ modulated feedback stream by a multiplexing technique such as interleaving. Feedback forcing time segments of the transducer digital timing pattern are split up: one for normal non-testing force feedback to the sensor, and a second for forcing the sensor up or down according to an injected test bit of the special purpose test bitstream. Recording of the sensor ADC output provides a signal which may be compared with the test signal for evaluation of the transducer.

The test bitstream is generated in a companion integrated circuit to the transducer.

The test bitstream is generated by a separate special purpose $\Sigma\Delta$ modulator, or by a look-up table and interpolator, or by generating a bit pattern offline and storing such bit pattern in memory of an associated micro-processor (integrated circuit).

A particular class of one-bit $\Sigma\Delta$ modulated test signals is preferred for in-situ testing of a closed loop accelerometer which includes a $\Sigma\Delta$ modulator in an ADC circuit. Such signal possesses special properties which make it suited for a testing architecture based upon the storage of short-length test patterns. Such patterns are repetitively accessed to form a continuous test bitstream. The test signal which results is characterized by low noise and low distortion.

The invention is advantageous in that no analog test signal is required to test the transducer. A method of testing a transducer which is inherently digital in its operation provides advantages in operation and precision of test results.

Recording of the sensor ADC output provides a signal which may be compared with the test signal for evaluation of the transducer.

BRIEF DESCRIPTION OF THE DRAWINGS

The objects, advantages and features of the invention will become more apparent by reference to the drawings which are appended hereto and wherein an illustrative embodiment of the invention is shown, of which:

FIG. 16A shows the frequency spectrum logarithmaticaly from 0 to $10^5$ Hz and FIG. 16B shows the passband portion of the frequency spectrum linearly from 0 to 300 Hz, and where the test bitstream is characterized by a 2048 bit buffer with pattern matching (390 bit pattern match); ½ full-scale sine wave at 62.5 Hz, 7-term Blackman Harris window, and $2^{17}$ bits.

DESCRIPTION OF THE INVENTION

This invention relates to the testing of a transducer having a sensor and a closed loop feedback loop which applies an oversampled Sigma Delta ($\Sigma\Delta$)bitstream back to the sensor to maintain a sensor element at a reference position. Rather than providing physical stimulation to the sensor in the form of an acceleration input, realized for example by a mechanical "shaker table" or the like, a precision one-bit $\Sigma\Delta$ modulated test bitstream signal is combined with the one-bit $\Sigma\Delta$ modulated feedback signal as a precision digital forcing signal to the sensor. The displacement of a sensor element caused by the test bitstream signal is automatically canceled by the one-bit $\Sigma\Delta$ modulated feedback bitstream of the transducer system. The output bitstream is recorded for subsequent analysis using conventional techniques to determine the response of the transducer system to the test output.

Figure 1:
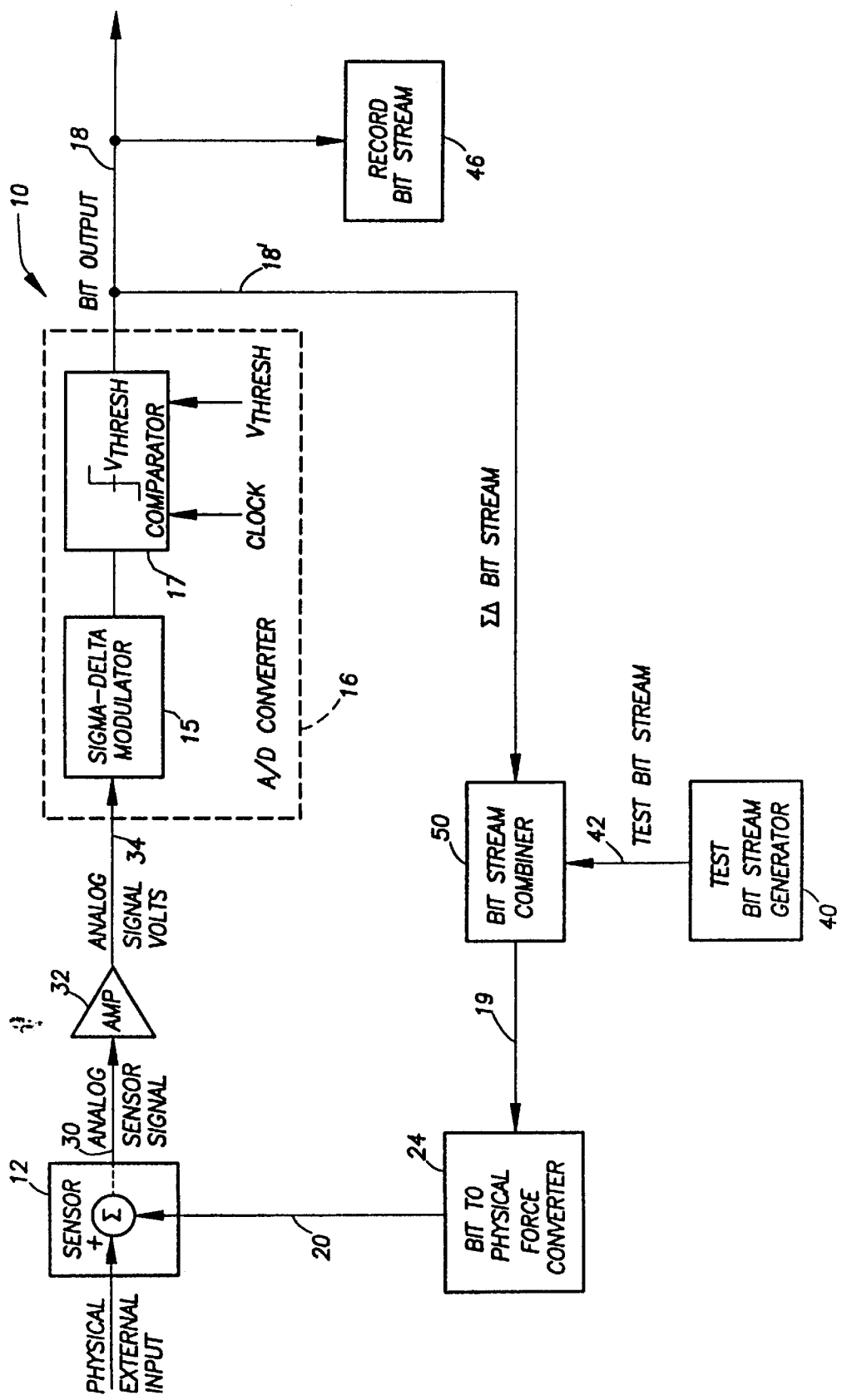
FIG. 1 is a block diagram illustrating a transducer system including a sensor closed loop system with a $\Sigma\Delta$ ADC which produces an output bitstream and a feedback bitstream and a test bitstream inserted in the feedback loop where the test bitstream is representative of an analog test signal for the transducer system.

FIG. 1 illustrates a preferred embodiment of the invention in a transducer system 10 which includes a sensor 12 and an Analog-to-Digital converter 16 which produces a bitstream output on output lead 18. A feedback path via leads 18', 19 applies the ADC bitstream to a bit-to-physical force converter 24 which applies such force in a summing relationship to sensor 12. Such transducer 10 preferably includes a micromachined sensor and oversampled ΣΔ modulator ADC of the type as illustrated in U.S. Pat. No. 4,922,756 which is incorporated herein by reference and is assigned to the assignee of this application. The preferred sensor 12 of the transducer of FIG. 1 is of the type illustrated in U.S. Pat. application Ser. No. 635,039 filed Apr. 17, 1996, which is a continuation application of parent application Ser. No. 218,525 (now abandoned) filed Mar. 28, 1994, and which is incorporated herein by reference. Such patent application is assigned to the assignee of this application.

The sensor 12 of FIG. 1 includes a central mass having conductive faces. The central mass is supported by springs from a support frame. Top and bottom conductive plates are provided which face opposite conductive sides of the central mass. The springs of such sensor 12 are preferably of an L-shape as disclosed in the above mentioned pending parent application. Such springs are preferably fabricated according to the methods disclosed in U.S. Pat. No. 5,484,073 which issued Jan. 16, 1996. Such patent is incorporated hereby by reference for its disclosure regarding spring manufacture.

The sensor 12 provides electrostatic force to return the central mass to a reference position in response to an external force or acceleration applied to the sensor. An analog sensor signal is output on lead 30 which represents the displacement of the central mass from a reference position. After amplification by amplifier 32, the analog signal is applied to Analog-to-Digital Converter (ADC) 16 which includes a Sigma Delta (ΣΔ) modulator 15 and comparator and comparator 17. An illustration of the Analog-to-Digital Converter 16 is provided in the above mentioned U.S. Pat. No. 4,922,756. The bitstream representative of the displacement of the central mass of the sensor 12 is applied as a one-bit ΣΔ modulated signal to a bit-to-physical force converter 24. Such converter 24 may take the form of a charge circuit or voltage circuit for creating a charge or a voltage to be applied to the central mass and/or to plates disposed above and below the mass so as to create an electrostatic force tending to drive the central mass back to its reference position. In the preferred embodiment of the invention, the central mass is used during at least one time segment of the entire cycle period to sense electrostatically its position from reference and during at least another time segment of the entire cycle period also to apply electrostatic force to it from the feedback path 18', 24 and 20 to return it to its reference position. The entire cycle period includes other time segments for equalization, etc. Time division multiplexing of the reference signal from the central mass and of the feedback force is used to simplify the mechanical configuration of the central mass and of the top and bottom plates which face conductive plates on the central mass.

For providing in-situ testing of the transducer 10, a test bitstream generator 40 is provided to apply a test bitstream on lead 42 which is applied to a bitstream combining device 50 for combining the external bitstream on lead 42 with the ADC feedback bitstream on lead 18'. A combined bitstream on lead 19 is applied to the bit-to-physical force converter 24 described above for application via schematic path 20 to sensor 12.

Figure 2A:
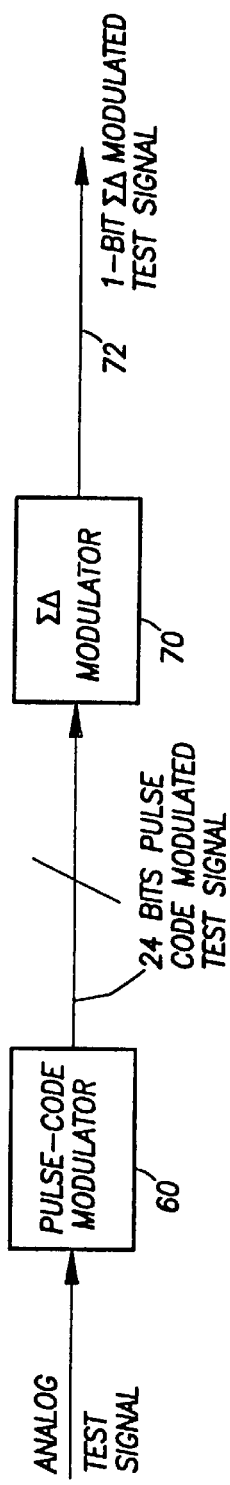
FIG. 2A is a block diagram illustrating one process for generating a single bit $\Sigma\Delta$ modulated test bitstream for in-situ testing of the transducer of FIG. 1.

FIG. 2A illustrates conceptually shows how a one-bit ΣΔ modulated test bitstream signal may be generated. An analog test signal may take the form, for example of a sine wave for measurement of transducer harmonic distortion and signal-to-noise ratio; a dual tone signal for measurement of intermodulation distortion; or a multiple tone signal for low resolution measurement of base band frequency response, etc. The analog test signal is applied to a pulse-code modulator 60 and then to a ΣΔ modulator 70 to produce a one-bit ΣΔ modulated test signal.

Preferably the word length of the pulse code modulator 60 is adequate to characterize the analog signal to be represented. The sample rate is preferably the same as the oversampling rate of the Sigma Delta Modulator. Generation of the one-bit ΣΔ modulated test signal may occur on-chip or off-chip. The term "on-chip" means the same integrated circuit on which the transducer 10 is provided. Bit generation can also be stored "off-chip" in computer memory in the form of a look-up table and an interpolator produced from off line generation.

Figure 2B:
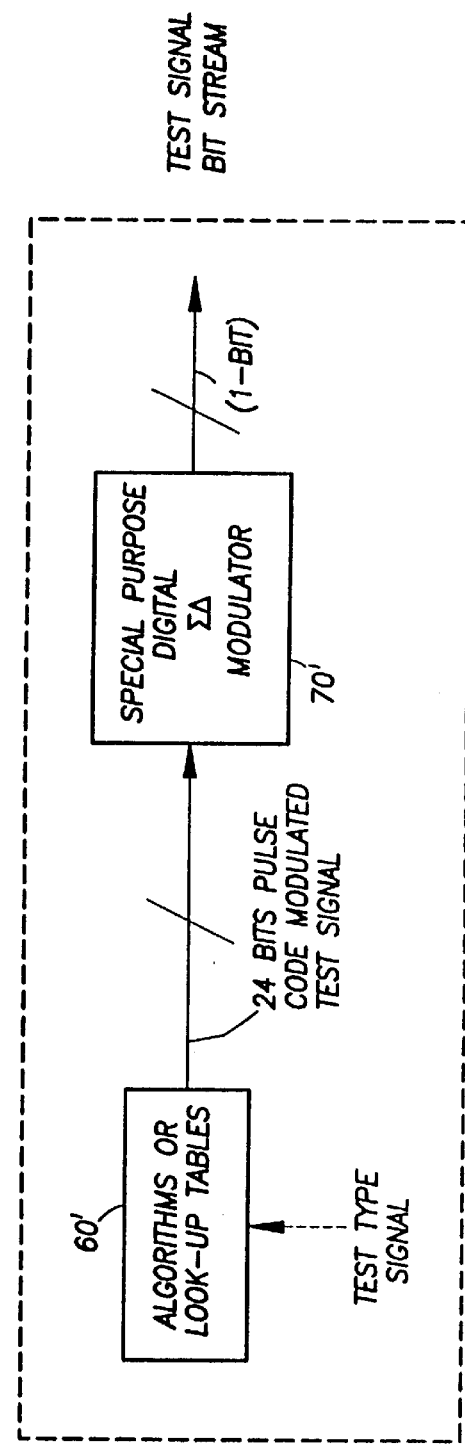
FIG. 2B is a block diagram illustrating a preferred arrangement and method for 15 generating a single bit $\Sigma\Delta$ modulated test bitstream for in-situ testing of the transducer of FIG. 1.

FIG. 2B illustrates a preferred embodiment of the conceptual method of generating a one bit ΣΔ modulated test signal. A microprocessor 100 is provided with a memory section 60' which, through algorithms or look-up tables, generates a 24 bit pulse code modulated test signal when a particular type test signal is input. Such test signals may be, for example, a sine wave, a dual tone signal, a multi-tone signal and so on. The arrangement of FIG. 2B may also be embodied in a microprocessor/FPGA arrangement, a microprocessor/ASIC arrangement or in an ASIC.

Generation of Short-Length, Repetitive Pulse Density Modulated Signals

The preferred method for generating the pulse code modulated test signal of FIG. 2B is to generate short-length pulse density modulated (POM) signals which are used to stimulate a Sigma Delta (ΣΔ)modulator 15 of FIG. 1. The method repeats the short-length signals contiguously to form a continuous 1-bit signal representing a test signal which may be a single tone, or multi-tone, etc. The repetitive pattern must be characterized by low noise and distortion in order that it may be useful to test the performance of an actual ΣΔ modulator, especially of a high order ΣΔ modulator, and/or to serve as a calibration signal. Such short-length patterns are preferably stored on an integrated circuit (IC), for testing of the actual ΣΔ modulator. Placing such patterns on an IC associated with a feedback transducer system with a ΣΔ modulator provides for built-in self test (BIST) of the transducer system. The preferred embodiment of the test patterns described below is for a precision accelerometer of FIG. 1, especially where the Sigma Delta modulator is a high order (e.g., 5th order) ΣΔ modulator. However such test patterns may be used in other transducer systems, which include a ΣΔ modulator and where a very low distortion signal source is required.

It is preferred that a test signal for testing of the system of FIG. 1 be capable of measuring a signal-to-quantization noise ratio (SQR) up to 120 dB(0–250 Hz band) and a signal-to-distortion ratio (SDR) up to 110 dB, both relative to a full-scale input. Accordingly, it is desired that the test signal have at least 120 dB SQR and at least 110 dB SDR.

Arrangements for Combining Feedback Bitstream with Test Bitstream

According to the invention, the test bitstream is injected into the transducer system feedback loop. The test bitstream induces electrostatic forcing in the same manner as the modulator of the system produces in the feedback bitstream. The feedback bitstream (and hence the modulator of the system's output) counters such force and simultaneously is the output of the transducer system. Accordingly, the test bitstream and the feedback bitstream must be combined.

The bitstream combiner or adder 50 of FIG. 1 represents an arrangement which may take several forms. Two prior arrangements/methods are described in a book titled *ANALOG SIGNAL GENERATION FOR BUILT-IN-SELF-TEST OF MIXED SIGNAL INTEGRATED CIRCUITS* by Gordon W. Roberts and Albert K. Lu, Kluwer Academic Publishers, pp 34–38, 1995.

Figure 3:
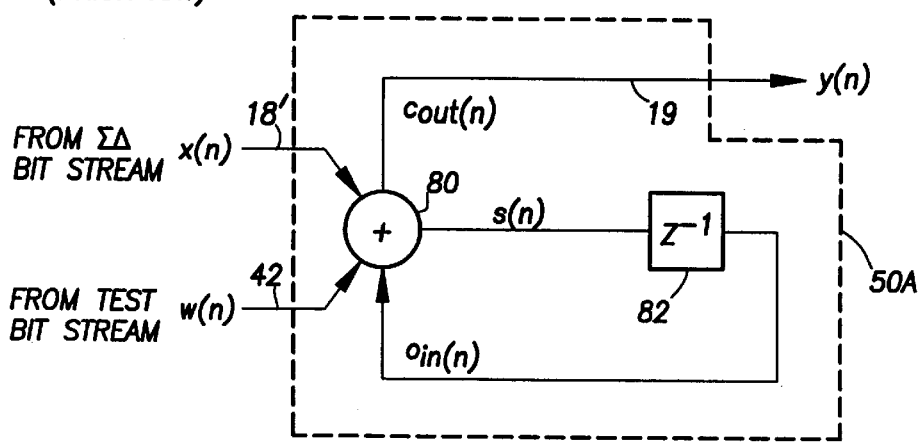
FIG. 3 illustrates a prior art method of first order Sigma Delta ($\Sigma\Delta$) noise shaping for combining two bitstreams.

FIG. 3 employs a method of addition described by Roberts and Lu which uses oversampling based noise-shaping where an adder 80 is a conventional full-adder with s, $c_{out}$, and $c_{in}$ equal to the sum, carry-out and carry-in bits, respectively. The output is taken from the carry-out of the adder. The actual sum will differ from the output by an amount equal to the sum bits s of the adder. This error is accounted for by applying the sum bit back to the carry-in $c_{in}$ through a unit delay 82. If Y(z), X(z), W(z) and S(z) correspond to the z-transforms of y(n), x(n), w(n) and s(n), then the z-domain equation which characterizes the arrangement of FIG. 3 is $$Y(z)=X(z)+W(z)-(1-z^{-1})S(z).$$

This equation corresponds to first-order Sigma Delta noise shaping and approximates the actual sum Y(z)+W(z) accurately, provided the signal information of the two inputs lie at low frequencies relative to the clock rate of the adder 80.

Figure 4A:
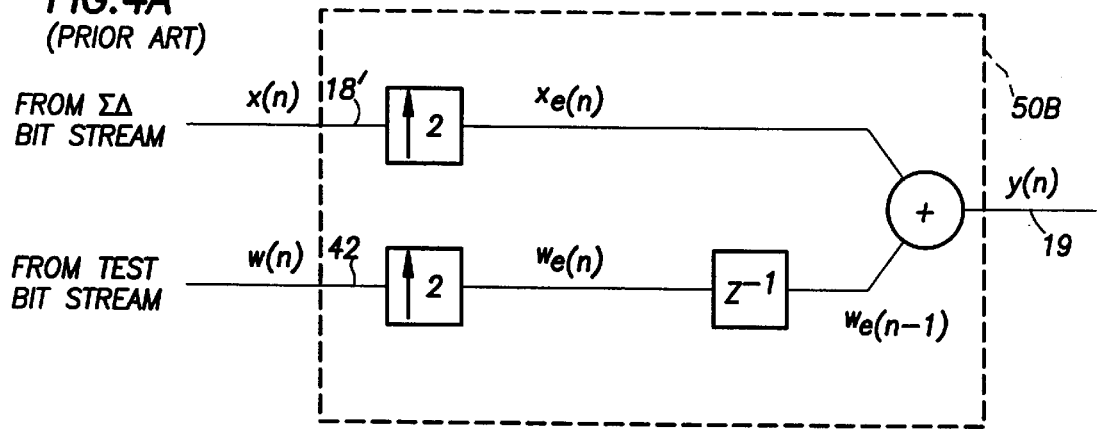
FIGS. 4A and 4B illustrate alternative prior art arrangements and methods of combining two bitstreams by an interleaving process.

A second method as described by Roberts and Lu of adding the ΣΔ bitstream on lead 18' and the test bitstream of lead 42 is to interleave the two input bitstreams into a single stream. In doing so the effective oversampling ratio and signal power of each signal are reduced by a factor of two. The clock rate and the amplitude of the output bitstream can be scaled to overcome such disadvantages. FIG. 4A illustrates that the two bitstreams on leads 18' and 42 are up-sampled by a factor of two prior to addition, with one stream, for example, the test bitstream on lead 42 passing through a unit-delay element. The up-sampling circuits are called sampling rate expanders and generate an output according to the equation $$x_e(n) = \begin{cases} x(n/2) \ldots n = 0, \pm 2, \pm 4, \pm 8 \ldots \\ 0 \ldots \text{otherwise} \end{cases}$$

The expander effectively increases the sampling rate by inserting zero-value samples between the previously existing samples. The arrangement of FIG. 4B is the functional equivalent to that of FIG. 4A.

Figure 4B:
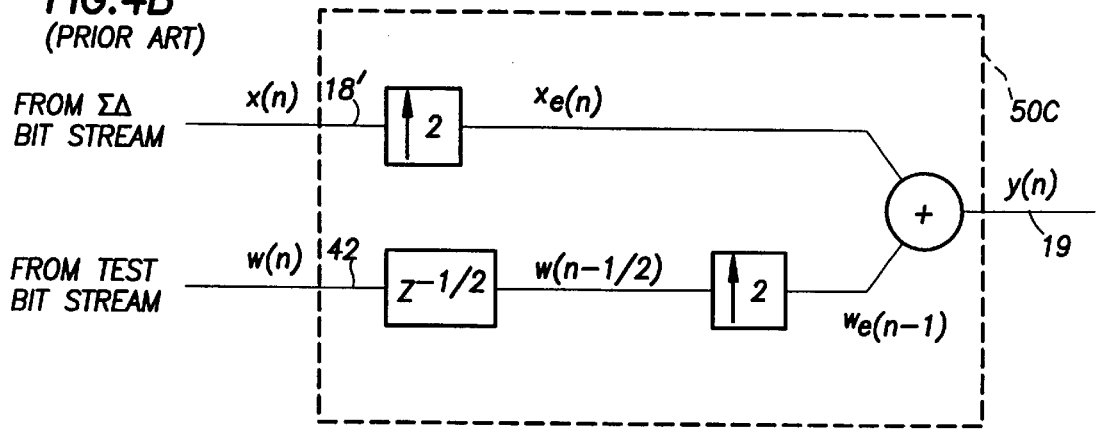

In the arrangement of FIG. 4A or 4B the two up-sampled bitstreams $x_e(n)$ and $w_e(n)$ are added and subsequently converted to analog form at the bit-to-physical force convertor 24 as illustrated in FIG. 1. In delaying $w_e$ by one sample (as in the case of FIG. 4A) or by one-half sample (as in the case of FIG. 4B), the signal's information content has not been altered, but a small phase shift has been added to it. Nonetheless, this phase shift error is not serious and may be corrected. It can be shown that delaying the up-sampled signal $x_e(n)$ by 1 sample is equivalent to delaying the original signal x(n) by 1/L samples, where L is the up-sampling ratio. By adding an appropriate phase-lead to w(n) to the arrangements of FIGS. 4A and 4B, the phase delay may be compensated for.

If the bitstreams are added as in the arrangement of FIG. 4A, their sum may be accurately represented by a single bitstream. This is so because at any sampling instant n, either $x_e(n)$ or $w_e(n-1)$ will be equal to zero and $x_e(n)+w_e(n-1) \leq 1$ for all n. Thus the sum $x_e(n)+w_e(n-1)$ is identical to the original two streams interleaved at twice the frequency.

Figures 5A, 5B:
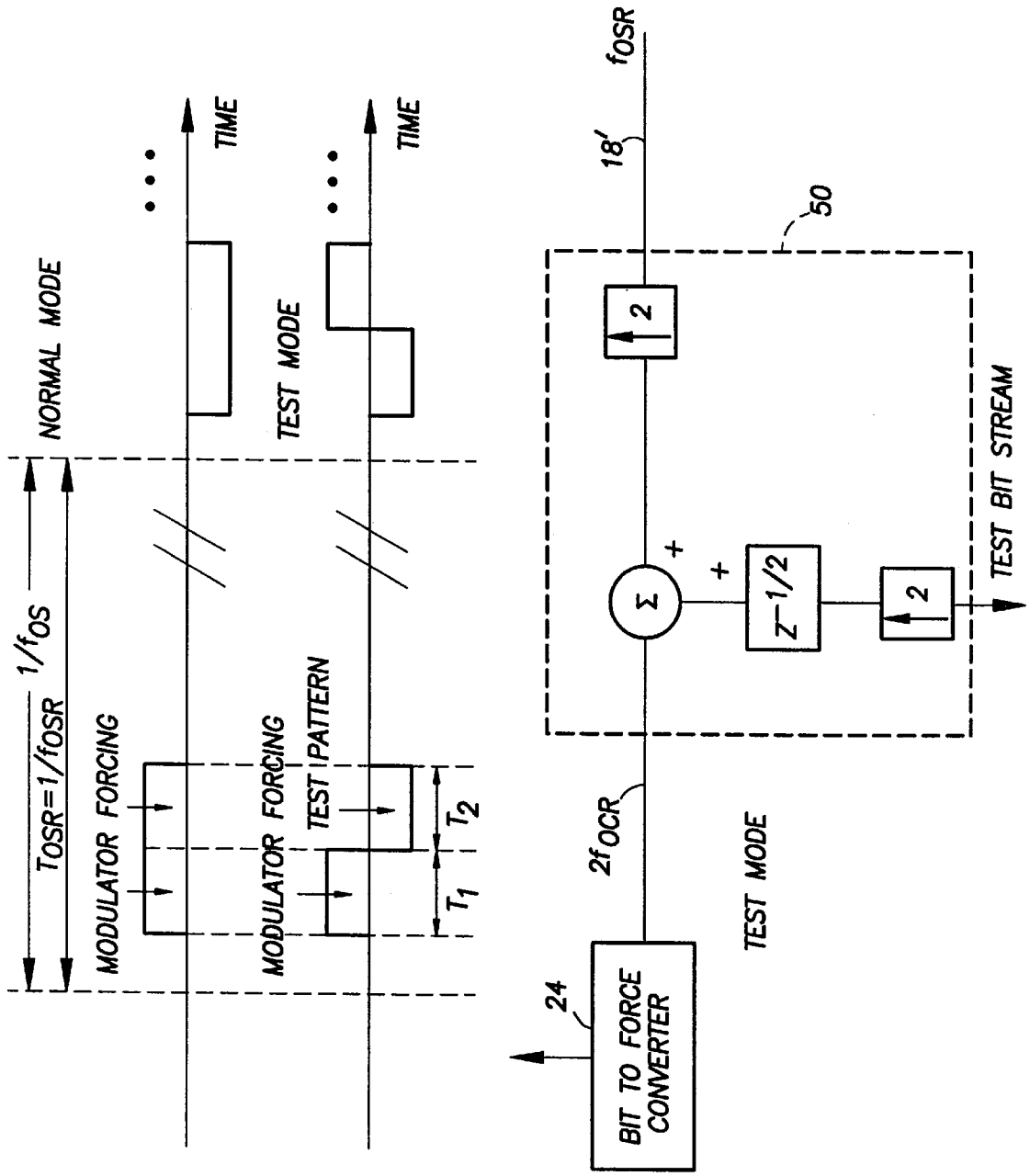
FIG. 5A and 5B illustrate a preferred arrangement and method for combining a test bitstream with a feedback bitstream in an interleaving process in a closed loop transducer system.

As described above, the preferred embodiment of FIG. 1 provides an over sampling rate (OSR) which defines a cycle period $T_{OSR}=1/f_{OSR}$. During one oversampling period of the ΣΔ modulator, sixteen (16) forcing/equalization/sensing periods are provided. In normal accelerometer use, only two of the sixteen periods are used to apply the ΣΔ feedback bit via lead 18' to bit-to-physical force converter 24 and sensor 12. FIG. 5A illustrates two time segments of the 16 total time segments in an oversampling period $T_{OSR}$.

According to the invention, during the test mode the two forcing periods $T_1$ and $T_2$ are used respectively for feeding back a bit from the output via lead 18' (FIG. 1) during $T_1$ and for applying the test bit during $T_2$. FIG. 5A depicts the interleaving technique. FIG. 5B, similar to the arrangement of FIG. 4B, shows the preferred arrangement of the bitstream combiner 53 which is effective for the two time periods $T_1$ and $T_2$ during the test mode of the accelerometer 10.

Generation of Test Bitstreams

Figure 6:
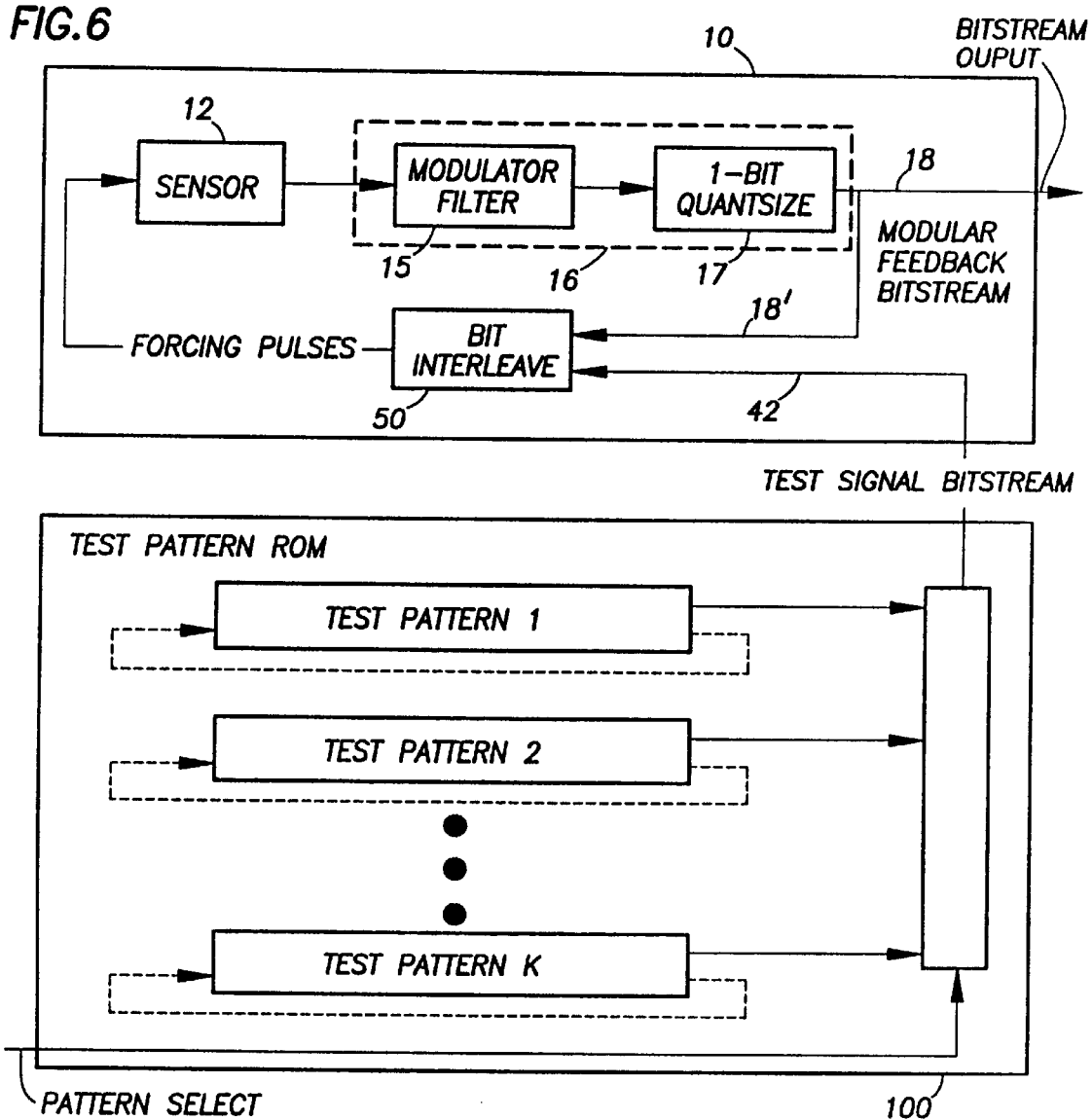
FIG. 6 schematically illustrates an arrangement for testing a $\Sigma\Delta$ modulator based closed loop transducer system where a test bitstream is generated by contiguously repeating a short test patter.

FIG. 6 illustrates the preferred method and apparatus for generation of a test signal bitstream for testing of transducer 10. A test pattern ROM 100 is provided which includes one or more test patterns. The transducer system 10 includes a combiner 50, preferably a bit interleaving arrangement illustrated above by reference to FIGS. 5A and 5B. A selected test pattern is read from the ROM 100 synchronously with the transducer's sample rate and interleaved with the transducer's feedback bitstream. A test pattern is repeated in a circular manner, that is a test pattern is repeated contiguously, one after another, resulting in a cyclic repetition of the stored test pattern.

Without special consideration for wrap-around effects, providing a bitstream output from a conventional ΣΔ modulator as the source of a repetitive test pattern results in unacceptable performance. For example, analysis of a $2^{17}$ bit output from a fifth-order ΣΔ modulator based transducer system as of FIG. 1 indicates that it achieves a SQR of 162 dB and a SDR of 160 dB for a 62.5 Hz sine wave signal. However, if 8192 bits (equivalent to four periods of the test signal) are selected from the output of this modulator and are cyclically repeated as a test bitstream to the transducer system, then a subsequent similar analysis indicates that the transducer system produces an SQR of 108 dB and an SDR of 94 dB. Clearly such SQR and SDR characteristics have been "degraded" by the test bitstream being used to test the transducer.

Method of Producing Short-Length Repetitive Test Patterns

A special-purpose ΣΔ modulator is provided to generate a long PDM (pulse density modulated) signal which meets the SQR and SDR requirements and has a high probability of bit patterns with long runs of matching bits. Next, an exhaustive search is made for N-length block of bits which, when used as a repetitive test pattern minimizes the artifacts introduced by repetition. The special-purpose modulator, called here a Test Pattern Generating (TPG) modulator, is implemented in software. A simulation of the transducer system is used in conjunction with the special-purpose ΣΔ modulator.

In the context of repetitive test pattern generation, there are at least two desirable characteristics of a ΣΔ modulator:

(1) Noise Shaping for Minimizing Sidelobes by Moving Noise from Signal Passband Repetition of the test pattern induces sidelobes in the pattern's amplitude spectrum coincidental with multiples of the reciprocal of the pattern length. The level of such sidelobes in the signal passband is related to noise shaping, because moving the quantization noise as far away as possible from the signal passband tends to reduce sidelobe levels.

(2) Correlation of Generated Bitstream with Short Test Pattern

The length of the repetitive test pattern must coincide with an integral number of periods of the test signal. Otherwise, the signal will not be phase coherent during wrap around. In other words, it is desirable that a resulting PDM test bitstream signal, including any quantization noise, be correlated as much as possible with the short length test pattern. Such a requirement tends to increase the likelihood that a bit pattern at the start of a block is similar to a bit pattern at the end of a block, thereby reducing wrap-around artifacts.

The noise shaping characteristic (as identified above) is achieved with a high pass filter with the cut-off frequency as high as possible. However, as the cut-off frequency is raised, the maximum out-of-band gain of the modulator increases, eventually resulting in instability. The maximum cut-off frequency for stable operation goes down as the order of the modulator goes up. Only regarding SQR and SDR requirements, the lowest order modulator with the highest cut-off frequency is an optimum configuration for sidelobe reduction.

The correlation characteristic (as identified above) also requires a low order modulator, because the randomness in quantization noise is greater with higher-order modulators which tends to reduce the likelihood of similarity in bit patterns at the block ends.

Figure 7:
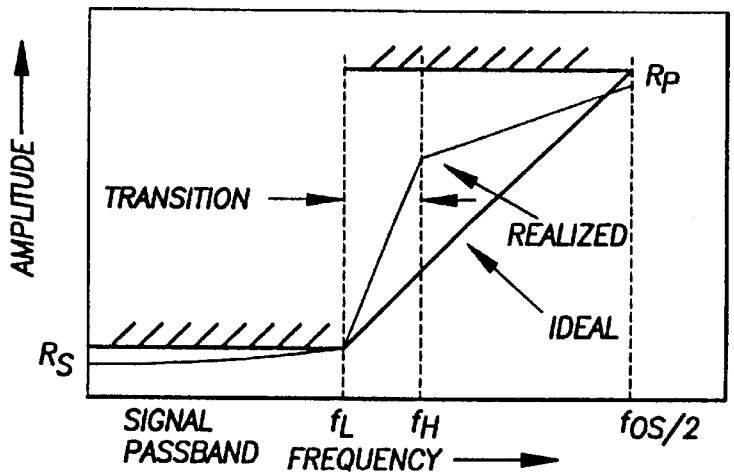
FIG. 7 schematically illustrates desired and realizable noise shaping characteristics for $\Sigma\Delta$ modulator used for test pattern generation.

An "ideal" noise shaping for the test pattern generating (TPG) modulator can be postulated based upon requirements for reducing sidelobes and increasing correlation of the generated bitstream with the short length test patterns. An ideal noise shaping graph is shown in FIG. 7. An example of a physically possible "realized" characteristic is also shown. The level $R_p$ represents a maximum out-of-band gain for stable operation. It is determined through a series of iterative steps of design, simulation and analysis. The level $R_s$ represents the maximum quantization spectrum level in the signal passband and is derived from a specification for SQR.

Figure 8:
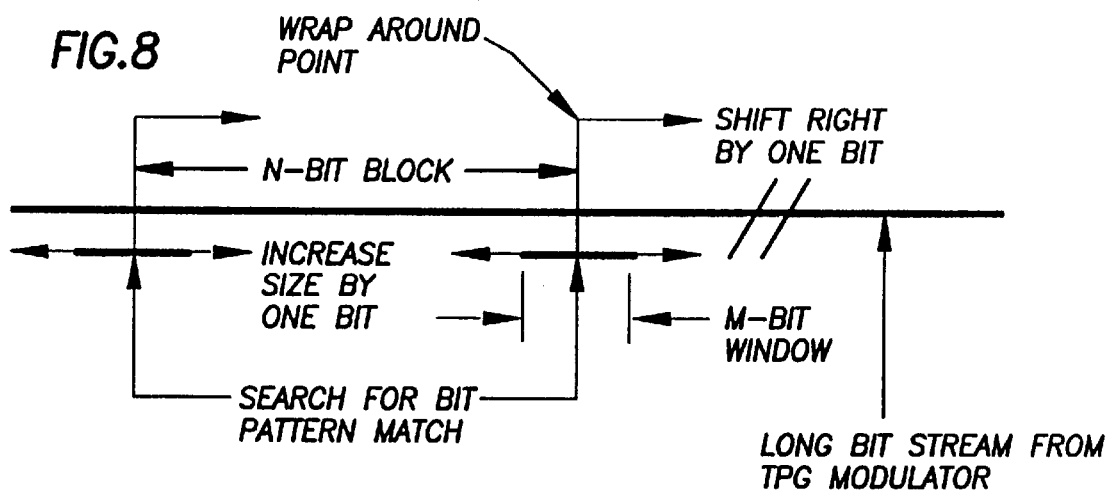
FIG. 8 schematically illustrates a bit pattern matching procedure.

FIG. 8 illustrates the method of searching for bit pattern matches according to the invention. An N-bit block, where N is the pattern length, is selected from a long bitstream output of the TPG modulator. Centered about each end of the block, M-bit blocks are selected and a pattern match (bit-by-bit comparison) is run. The N-bit block with the largest M (i.e., the greatest number of matched bits at the wrap-around point) is selected as the repeating test pattern. The number of matched bits at the block ends, M, is an effective characteristic for choosing the block of bits, which when accessed repetitively, results in the "smoothest" transition at the wrap-around point, thereby minimizing the wrap-around artifacts.

Design of the TPG Modulator

Figure 9:
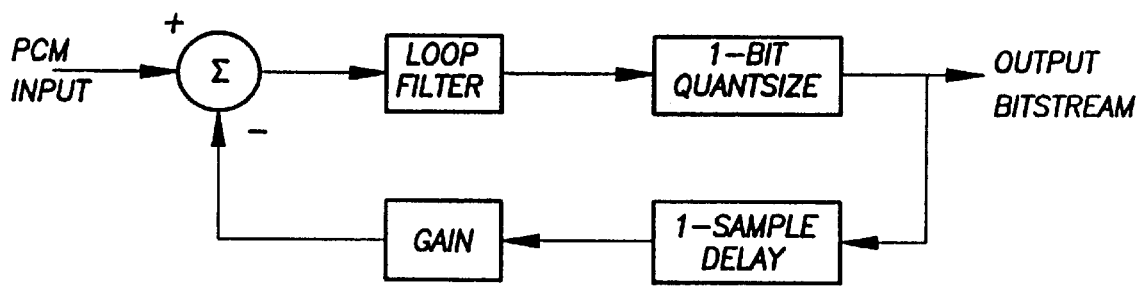
FIG. 9 is a block diagram of a generic $\Sigma\Delta$ modulator for test pattern generation.

A block diagram of a generic ΣΔ modulator is shown in FIG. 9. The modulator of FIG. 9 differs from a conventional ΣΔ modulator only in that it is intended to forever reside in software and therefore does not have the constraints placed upon it that are typically associated with hardware implementation.

Relevant characteristics of the "software" modulator are as follows:

(1) The input to the modulator is a digital pulse-code-modulated (PC test signal;

(2) The output is a PDM bitstream representation of the test signal;

(3) The loop filter is a recursive, infinite impulse response (IIR) digital filter operating at the oversampling rate, $f_{os}$ of the transducer or modulator being tested (MUT); and (4) Sixty-four (64) bit floating point numerics are used throughout.

Figure 10:
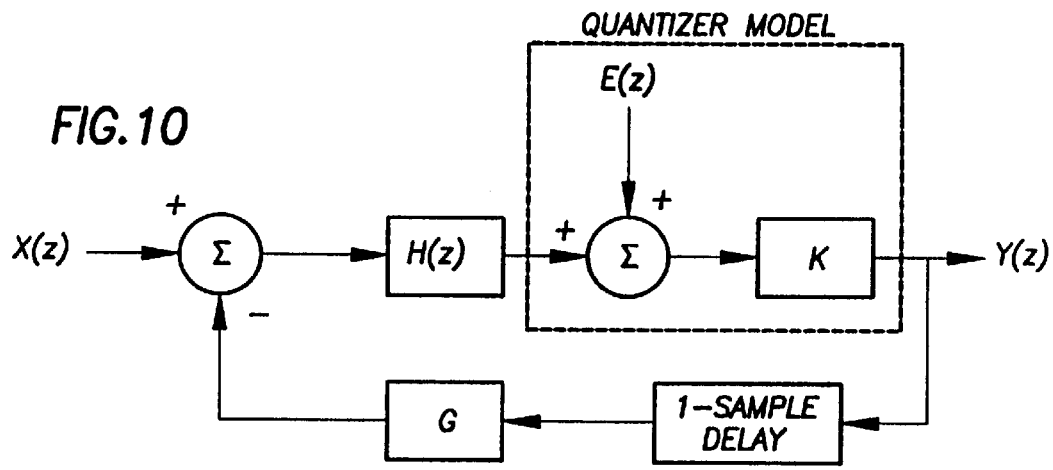
FIG. 10 is a block diagram based on a linear model of a generic $\Sigma\Delta$ modulator which includes a model for quantizing noise in the $\Sigma\Delta$ modulator of the transducer system under test.

It is preferred to replace the quantizer in FIG. 9 by an additive white noise source and a gain as shown in FIG. 10.

The modulator of FIG. 10 has a closed loop noise transfer function (NTF) given by $$\frac{Y(z)}{E(z)} = H_{CL}(z) = \frac{K}{1 + z^{-1}KGH(z)} \quad (1)$$

where H(z) is the open loop modulator filter transfer function. Since $$H(z) = \frac{N_{OL}(z)}{D_{OL}(z)}, \quad (2)$$

Equation 1 can be rewritten as, $$H_{CL}(z) = \frac{KD_{OL}(z)}{KD_{OL}(z) + z^{-1}KGN_{OL}(z)} = \frac{N_{CL}(z)}{D_{CL}(z)} \quad (3)$$

Therefore, the denominator of the open loop filter transfer function is given by $$D_{OL} = \frac{N_{CL}(z)}{K} \quad (4)$$

and its numerator is given by $$N_{OL}(z) = \frac{z(D_{CL}(z) - D_{OL}(z))}{KG}. \quad (5)$$

Since $D_{CL}(z)$ and $D_{OL}(z)$ will typically have unity as their $z^0$ coefficients, $N_{OL}(z)$ will be causal. Equations (4) and (5) provide explicit formulas for computing the open loop modulator filter transfer function given the desired closed loop transfer function and the gain terms G and K. The gain term G is the bit-to-acceleration transconductance associated with the transducer system for testing. The K term is called the "quantizer gain" and is determined experimentally using simulations. In an initial design, K is assumed to one (1).

It is preferred to provide an IIR digital filter design for realizing the filter defined by equations (3), (4) and (5). Numerous computer-aided digital filter design packages may be used to define such digital filter. The use of such digital filter design packages allows for rapid design and testing of modulators with novel noise shapings based on any of the numerous known analog filters such as Elliptic, Chebychev, Bessel and Butterworth.

Thus, the steps for creating a TPG modulator of the form of FIG. 10 are (1) select the modulator order;

(2) determine the coefficients of the closed loop noise transfer function (NTF) numerator and denominator (or equivalently, the NTF poles and zeros);

(3) using equations (4) and (5), compute the open loop modulator filter transfer function;

(4) select a suitable input signal (frequency and amplitude), and;

(5) run a simulation of the resulting modulator to verify its operation.

Steps 1–5 ordinarily are repeated to determine a satisfactory modulator.

Figure 11A:
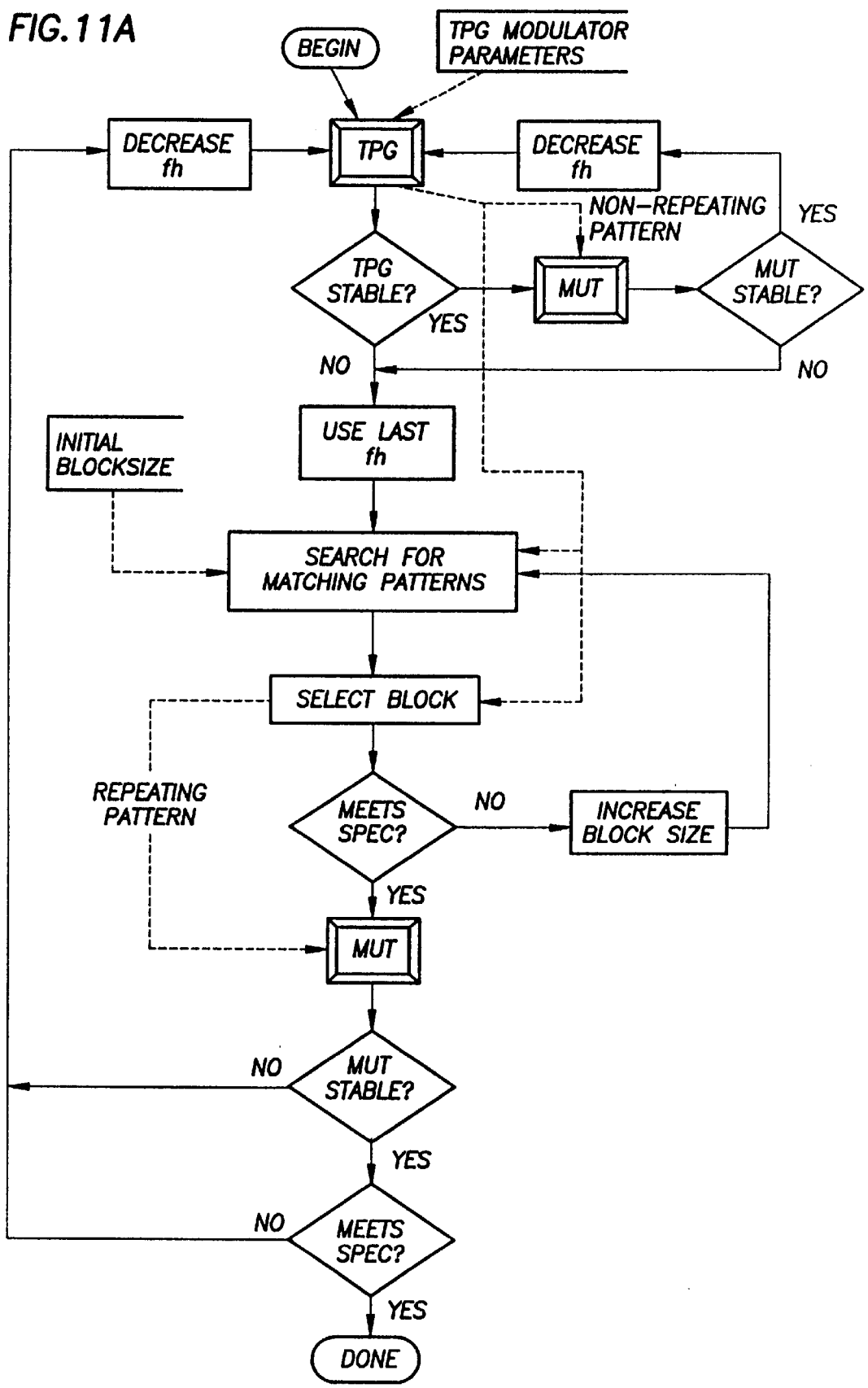
FIG. 11A is a logic diagram illustrating a procedure for test pattern generation according to the invention for determining characteristics of a Test Pattern Generator (TPG) by reference to an actual $\Sigma\Delta$ modulator based transducer system (MUT) where $f_H$ refers to a modulator high-pass cut-off frequency of FIG. 7 and block size refers to the block size of FIG. 8.

A logic flow diagram of FIG. 11A demonstrates the process for determining near-optical TPG modulator design parameters in the context of generating a shortest pattern block size.

The term MUT in FIG. 11A refers to a digital simulation of the transducer system or "Modulator Under Test". The term TPG refers to a digital simulation of the Test Pattern it Generating modulator. The underlying idea of the procedure of FIG. 11A is to increase the TPG modulator high-pass cut-off frequency, $f_H$, to the point just before instability occurs in either the TPG or the MUT. The pattern search is then executed. The initial pattern length corresponds to one period of the test signal. If the SQR and SDR at the output of the MUT are at required levels, then the process is terminated. Otherwise, a larger block size is used and the process is performed again.

Figure 11B:
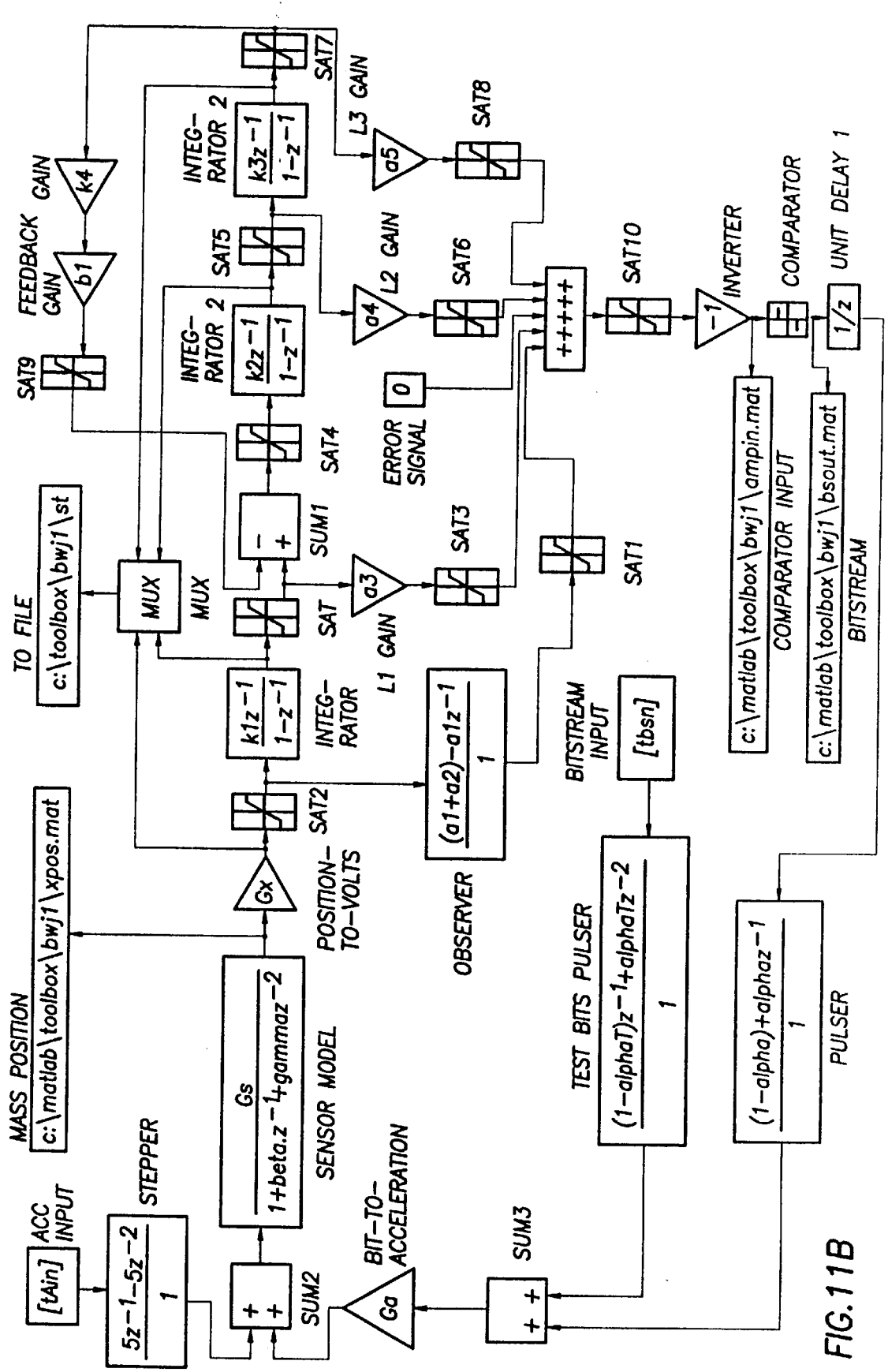
FIG. 11B is a block diagram of a simulation model of a closed loop transducer system with an ADC which includes a $\Sigma\Delta$ modulator and which is to be tested.

A Mat Lab/Simulink model of a transducer system, e.g., a sensor-based ΣΔ modulator used as the MUT in examples below, is illustrated in FIG. 11B. The model is characterized by (1) a pulse-invariant, discret model of sensor dynamics; and
(2) a linearized, small-signal, model of the non-linear forcing and sensing operations.

The parameter values used in the simulations described below are summarized in Table 1 below.

TABLE 1

Modeling Parameters for MatLab/Simulink Sensor-based ΣΔ Modulator.

| | |
|---|---|
| Fs = | Modular sample rate (Hz) |
| alpha = | Pulser parameter (edge 2 to 4) |
| alpha = | Test bits pulser (edge 3 to 4) |
| beta = | Sensor z^-1 term |
| gamma = | Sensor z^-2 term |
| Ga = | Bit-to-acceleration |
| Gs = | Sensor Gain |
| Gx = | Position-to-volts |
| klsc = | Gain re-distribution constant |
| a1 = | 1st feedforward coefficient |
| a2 = | 2nd feedforward coefficient |
| a3 = | 3rd feedforward coefficient |
| a4 = | 4th feedforward coefficient |
| a5 = | 5th feedforward coefficient |
| k1 = | Integrator 1 gain term |
| k2 = | Integrator 2 gain term |
| k3 = | Integrator 3 gain term |
| k4 = | Integrator 4 gain term |
| b1 = | Feedback coefficient |

An example of the repetitive test pattern design using the techniques described earlier is presented below.

Modulator Order Selection

As discussed above, the TPG modulator should be of the lowest order while still capable of meeting the SQR and SDR requirements. Using the noise shaping techniques discussed above, pulse density modulated (PDM) bitstreams, which when used as repetitive test patterns, achieved SQR>120 dB//full-scale and SDR>110 dB//fill-scale using a third-order ΣΔ transducer system (MUT).

NTF Zero/pole Placement

The desire to use the lowest possible order of modulator while still providing adequate SQR necessitates a Noise Transfer Function (NTF) filter with the steepest possible transition from the signal passband to the noise passband. A class of elliptic filters provides the fastest transition for a given ripple specification and filter order. Consequently, a closed loop NTF filter based on a highpass elliptic filter approximation is preferred. The elliptic filter has ripple specifications as well as a highpass cutoff frequency specification. Simulation results suggest that a noise passband ripple of around 0.1 dB results in adequate noise shaping with no evidence of premature instability due to out-of-band peaking, and that a maximum stopband attenuation of 100 dB can be realized with a third order filter. Consequently, the closed loop NTF pole locations are determined by a single paramater, $f_H$ (See FIG. 7). Using the design process shown in FIG. 11, a nominal value for $f_H$ is 7800 Hz. The elliptic filter design parameters for the TPGs used herein are summarized in Table 2.

TABLE 2

Elliptic Filter Design Parameters for NTF pole placement.

| | |
|---|---|
| Filter Order: | 3 |
| Filter type: | Elliptic highpass |
| Sample rate: | 128 Khz |
| Cutoff frequency: | 7800 Hz |
| Maximum passband ripple: | 0.1 dB |
| Minimum stopband attenuation: | 100 dB |

A NTF based solely on a conventional IIR highpass filter design often does not satisfy the noise rejection requirements at the high-end of the signal passband. Consequently, the numerator of the NTF, $N_{CL}(z)$ in Equation 3, may be used to place transmission zeros across the signal passband. Optimal placement of these zeros concerns minimizing the integrated quantization noise in the signal passband. For a third-order modulator with a signal passband extending to $f_L$, calls for placement of the three NTF zeros at $$Z_{1,2} = \rho(\cos \theta \pm j \sin \theta) \quad (6)$$

$$Z_3 = \rho, \quad (7)$$

where $$\theta = \sqrt{3} / 5 \frac{2 f_L}{f_{OS}} \quad (8)$$

and $\rho$ is the magnitude of the zeros and $f_L$ and $f_{OS}$ are the upper edge of the signal passband and MUT sampling frequency, respectively (see FIG. 7).

When $\rho=1$ (all zeros on the unit circle), the integrated quantization noise in the signal passband is minimized. This, however, is not the only design objective for the TPG modulator. Moving the zeros away from the unit circle (i.e. $0<\rho<1$) has a direct effect on the likelihood and length of bit pattern matches at the ends of the block. This is significant in that a single parameter, $\rho$, can be used to maximize the pattern match length at the block ends and thereby minimize the wrap-around artifacts.

Figure 12:
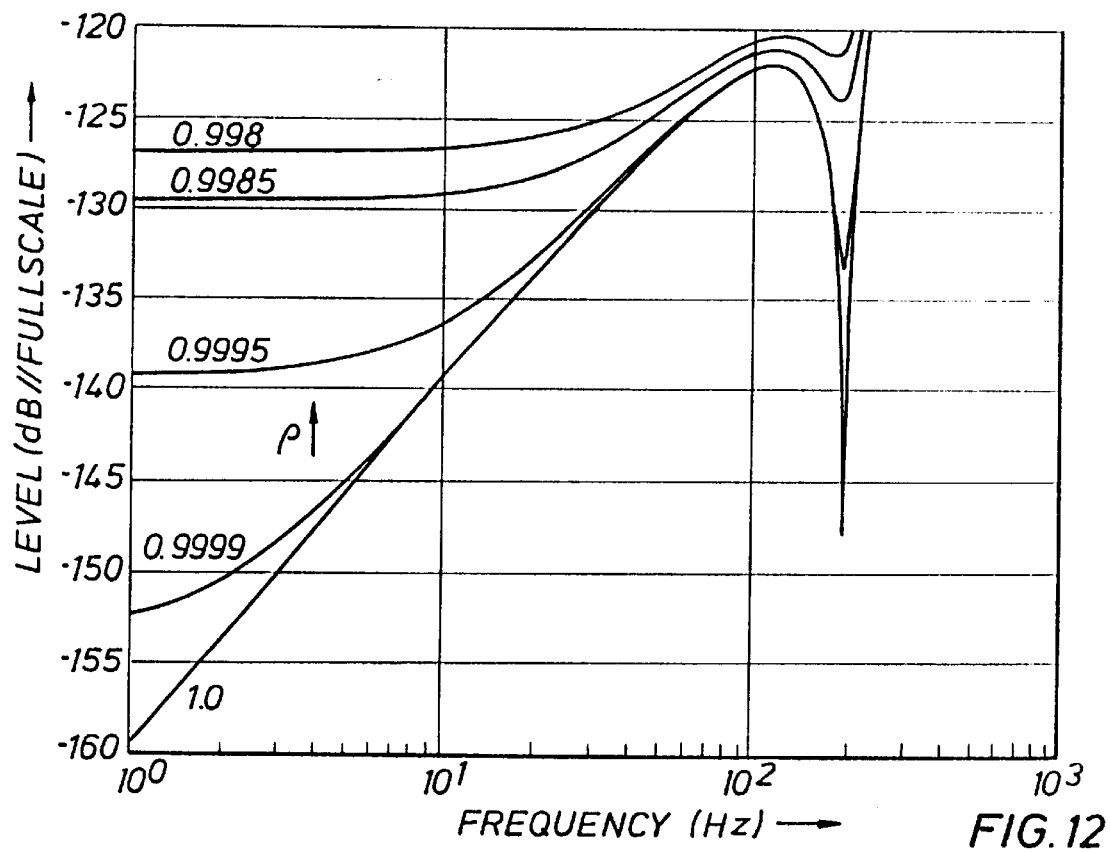
FIG. 12 is a graph illustrating noise shaping in the signal passband parameterized by the magnitude of the Noise Transfer Function zeros.

FIG. 12 shows the signal passband portion of the NTF as a function of the parameter $\rho$. Moving NTF zeros away from the unit circle tends to flatten the signal passband portion of the NTF. The passband integrated noise increases as $\rho$ decreases, thereby placing a limit on how small $\rho$ can be and still meet the SQR requirements.

Table 3 shows the testing capabilities of repetitive test patterns generated using four different values of $\rho$. The SQR and SDR values are measured at the output of the MUT using the repetitive patterns from the TPG (with pattern matching) as the test stimulus. The number of bits matched, M, increases as ρ decreases. This translates directly to an increase in SQR and SDR. (For ρ<0.998, the SQR requirements can not be met.) Table 3 indicates that the testing requirements can be met with a block length of 2048 bits when p=0.998. This corresponds to one period of the 62.5 Hz test signal.

TABLE 3

Pattern Match Lengths, Measured SQR and SDR as a Function of ρ. ½ full-scale sine wave at 62.5 Hz, 2 1 7 bits from the MUT; N is the test pattern block length, M is the number of bits matched; $f_H$ = 7800 Hz.

| ρ | N | M | SQR (dB) | SDR (dB) | σ (dB)* |
|---|---|---|---|---|---|
| 1.0 | 2048 | — | — | — | — |
| 1.0 | 4096 | 41 | 120.9 | 93.9 | 4.8 |
| 0.9995 | 2048 | 30 | 125.6 | 85.8 | 2.2 |
| 0.9995 | 4096 | 193 | 124.6 | 116.1 | 2.8 |
| 0.998 | 2048 | 390 | 126.5 | 110.7 | 2.5 |
| 0.998 | 4096 | 339 | 125.4 | 111.5 | 2.5 |
| 0.998 | 8192 | 251 | 121.9 | 111.6 | 3.1 |

*Standard error on the SQR and SDR measurements

It is believed that as the low frequency content of the quantization noise is increased, the tendancy is to increase the likelihood of noise patterns mixing with the signal. This mixing tends to increase the signal dependence in the noise, and therefore the correlation between the signal and the noise.

Figure 13:
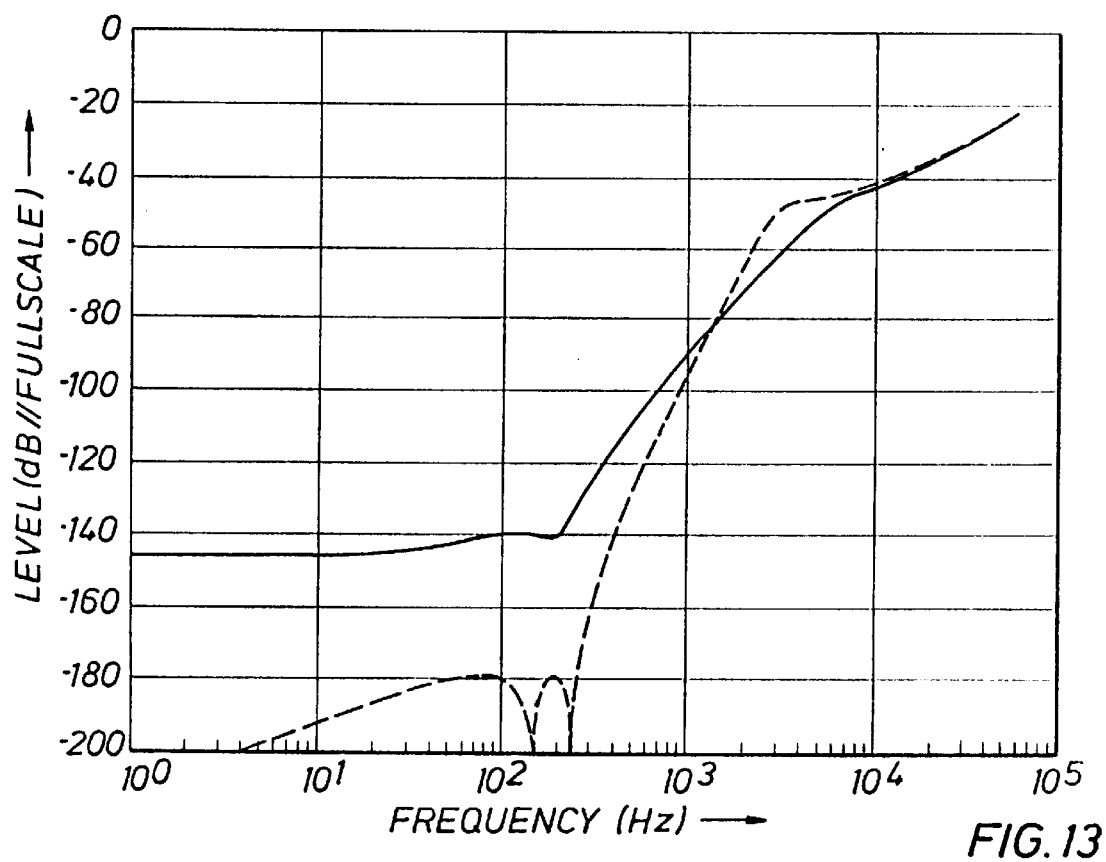
FIG. 13 is a graph illustrating Noise Transfer Functions for 3rd order (solid line) and 5th order (dashed line) TPG modulators where the effective quantizer gain K is approximately 3 in both cases.

The NTF for a third-order TPG modulator (solid line) is shown in FIG. 13 along with the fifth-order case (dark line). The increased low frequency quantization noise and higher cutoff frequency of the third-order TPG modulator relative to the fifth-order modulator are clearly apparent.

Pattern Matching

Figure 14:
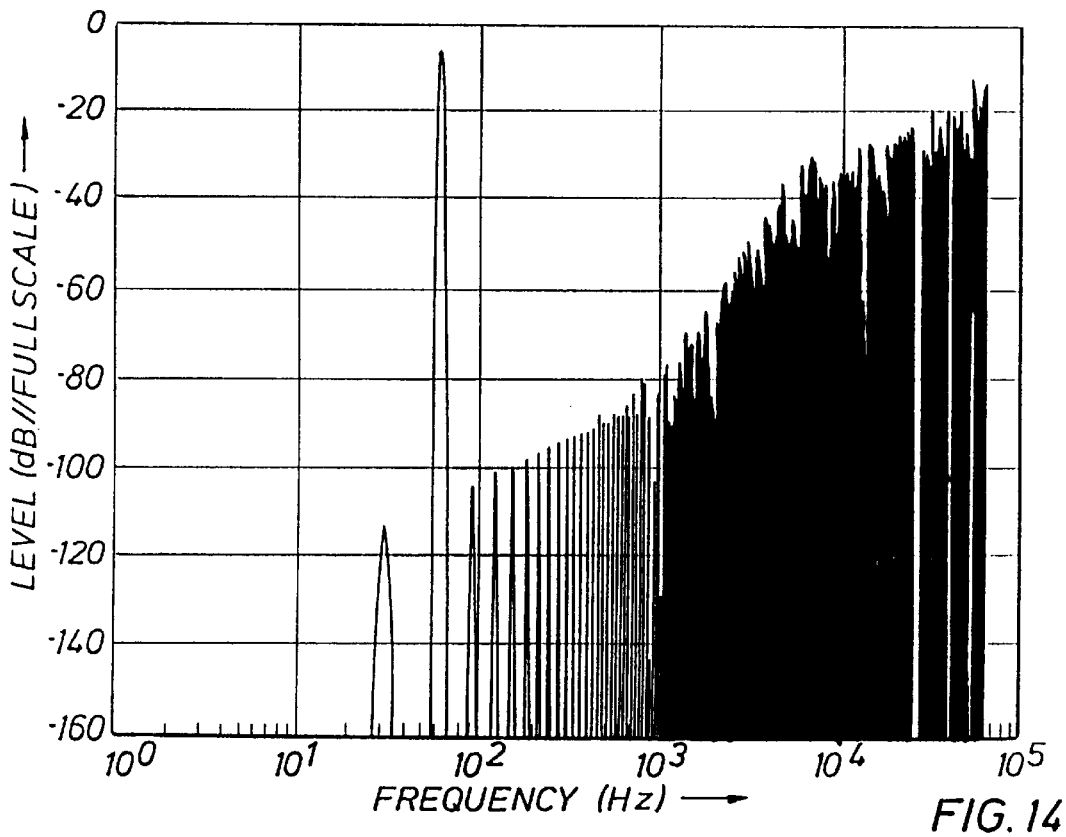
FIG. 14 is a graph illustrating the spectrum of a bitstream from a 3rd order TPG modulator without pattern matching characterized by a 4096 bit buffer, ½ full-scale sine wave at 62.5 Hz, 7 term Blackman Harris window and $2^{17}$ bits.
Figure 15:
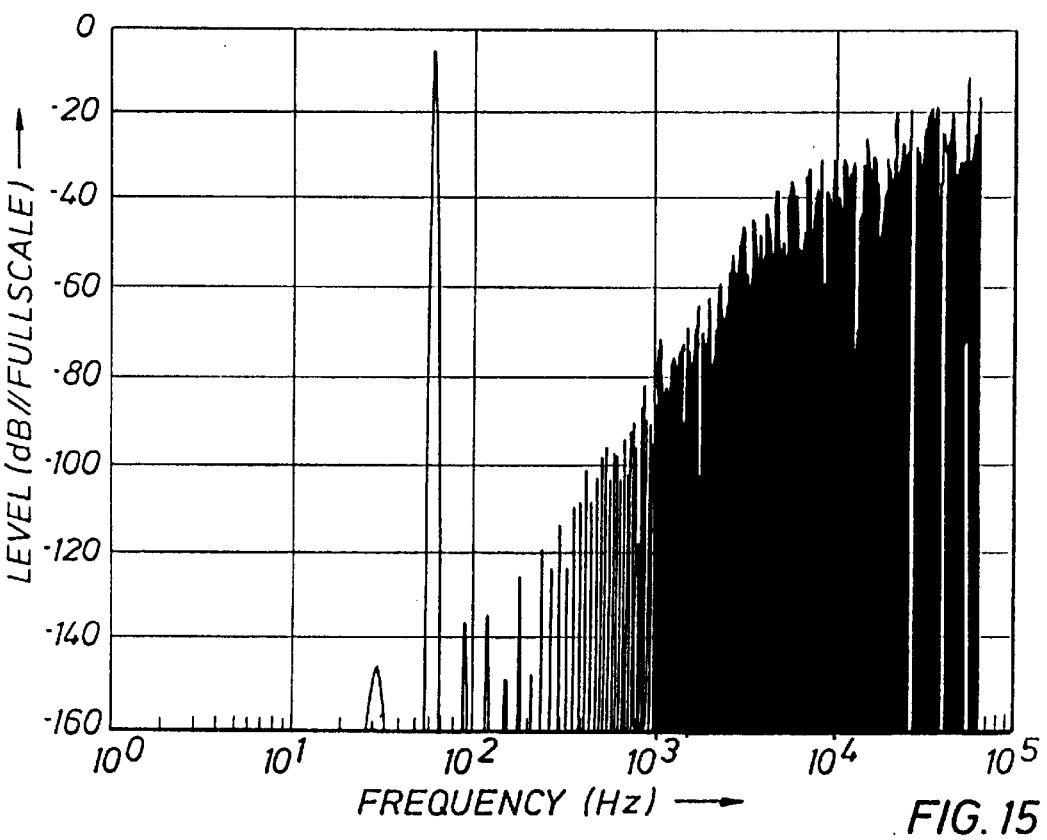
FIG. 15 is a graph illustrating the spectrum of a bitstream from a 3rd order TPG modulator with pattern matching (339 bit pattern match) and characterized by a 4096 bit buffer, 2 full-scale sine wave at 62.5 Hz, 7 term Blackman Harris window and $2^{17}$ bits.

FIGS. 14 and 15 show the effect of the pattern matching procedure. In FIG. 14 the spectrum of 32 repeated blocks of 4096 bits is shown without pattern match (the 4096 block is selected at random from a $2^{17}$-bit output from the TPG). The sidelobes introduced by the repetition are clearly evident. FIG. 15 again shows the spectrum of 32 repeated blocks of 4096 bits, but for this case the block is selected to maximize the pattern match at the block ends. The sidelobes due to repetition have been reduced by an average of about 30–35 dB.

Simulation Results

Figure 16A:
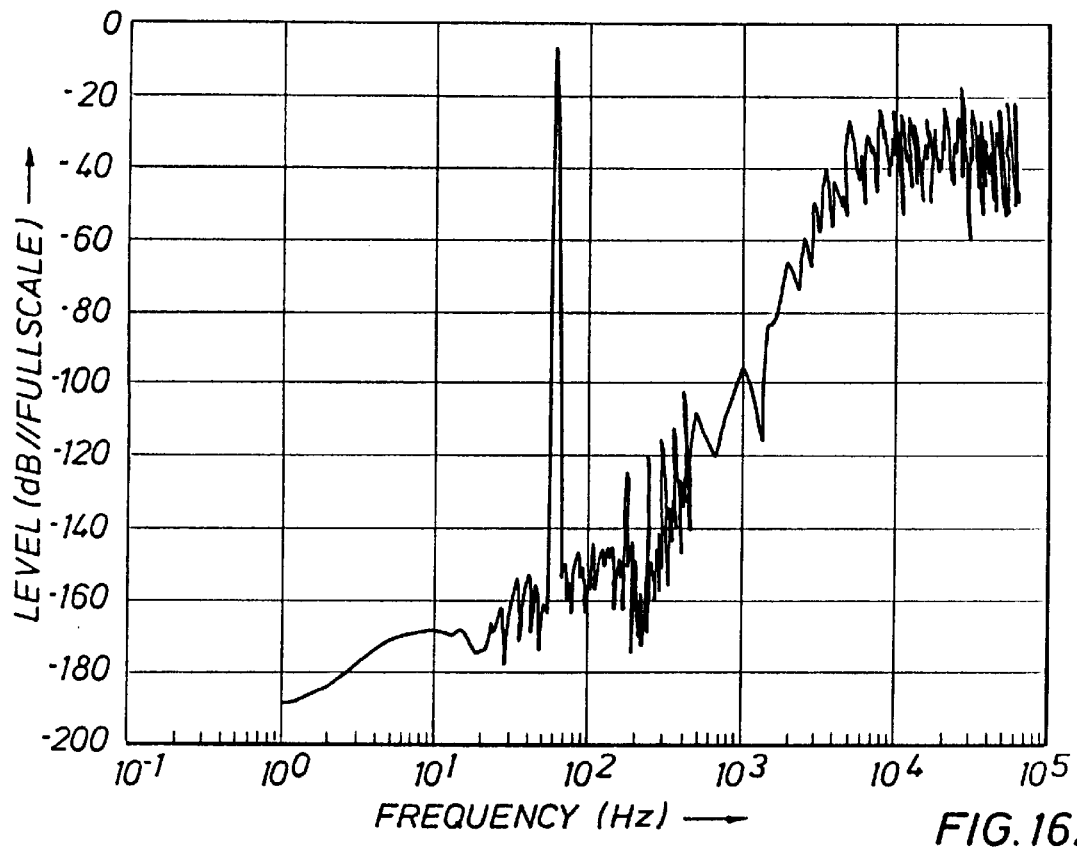
FIGS. 16A and 16B are graphs of a bitstream from a closed loop transducer (Modulator Under Test) where
Figure 16B:
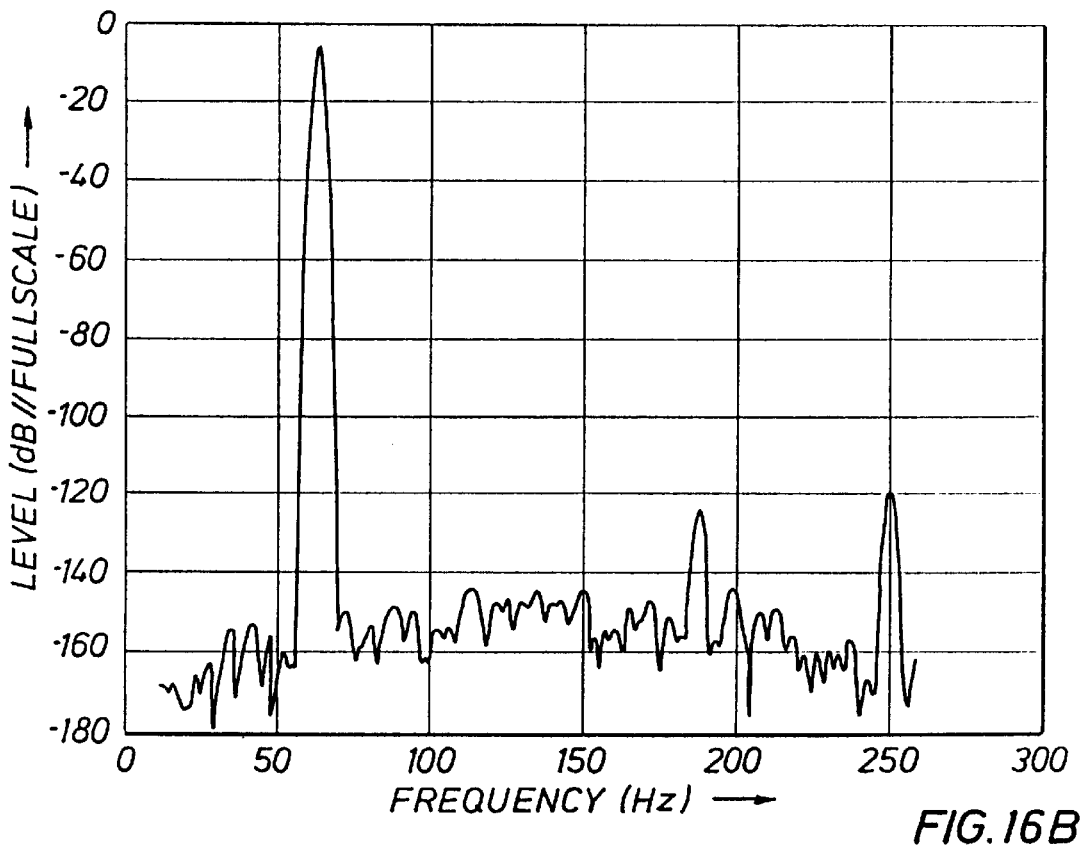

FIGS. 16A and 16B show the spectrum at the output of the MUT using a repetitive test pattern generated using the techniques described herein. The test signal is a 62.5 Hz sine wave, and the block length is 2048 bits—equivalent to one period of the test signal. Although sidelobes are still evident, their levels in the signal passband are below that required to meet the SDR requirement.

Table 4 summarizes the results of the repetitive test pattern generation technique applied to three test tones. In each case the SQR and SDR requirements are met using block lengths equivalent to one period of the associated test tone.

TABLE 4

Summary of Simulation Results for Three Test Signal Frequencies. ½ full-scale sine wave, $2^{17}$ bits from the MUT; N is the test pattern block length, M is the number of bits matched; $f_H$ = 7800 Hz.

| $2f_T$ (Hz) | N | M | QR (dB) | SDR (dB) | σ (dB) |
|---|---|---|---|---|---|
| 31.25 | 4096 | 234 | 127.3 | 110.7 | 3.4 |
| 62.5 | 2048 | 390 | 126.5 | 110.7 | 2.5 |
| 125 | 1024 | 288 | 127.4 | 125.8 | 2.2 |

As illustrated in FIG. 1, the bitstream of sensor 10 is recorded in computer memory 46 for subsequent analysis of test results. Most if not all of the output signal measurements are done off-chip. A preferred way to evaluate the test results is to create a Fourier Spectrum of the recorded bitstream and to compare such Fourier Spectrum against a Fourier Spectrum of a "mint" transducer which has been subject to an identical test bitstream. Analysis of the differences between the Fourier Spectrum under test and that of the mint transducer produces characteristics of the "goodness" of the tested transducer.

Although the preferred embodiment of the invention is of that of FIG. 1 where a transducer system is illustrated as an accelerometer intended for use as a geophone in the seismic data acquisition industry, the invention finds application for testing of any closed loop transducer where two bitstreams may be interleaved in a feedback loop. Thus, the invention finds application for in-situ all-digital testing of pressure sensors, temperature sensors, humidity sensors which are part of a transducer system including a Sigma Delta loop.

Various modifications and alterations in the described methods of manufacture and apparatus will be apparent to those skilled in the art of the foregoing description which does not depart from the spirit of the invention. For this reason, such changes are desired to be included within the scope of the appended claims. The appended claims recite the only limitations to the present invention. The descriptive manner which is employed for setting forth the embodiments should be interpreted as illustrative but not limitative.

What is claimed is:

1. A method for generating a test bitstream for testing a closed loop transducer which includes a sensor and an Analog-to-Digital converter (ADC) having a ΣΔ bitstream which is fed back to said sensor, comprising the steps of
   generating a pattern bitstream and
   repeating said test pattern bitstream to form said test bitstream.

2. The method of claim 1 wherein said step of generating said pattern bitstream includes the steps of
   (a) producing a simulation model of said closed loop transducers with a ΣΔ modulator (MUT) and providing at least one performance specification of said MUT;
   (b) producing a simulation of a test pattern generating (TPG) modulator where said TPG modulator is characterized by simulation parameters;
   (c) specifying said simulation of a TPG modulator with a first set of simulation parameters to produce a pattern bitstream which is short in time length compared to said test bitstream;
   (d) repeating said pattern bitstream to produce a candidate test bitstream;
   (e) applying said candidate test bitstream in said step of combining said test bitstream with said ΣΔ to produce said combined bitstream;

(f) repeating said steps (c), (d), and (e) by varying said simulation parameters until a final candidate test bitstream used in said simulation of said MUT produces stable operation which meets said at least one performance specification; and (g) storing said final candidate test bitstream for use as said test bitstream.

3. The method of claim 2 wherein said simulation parameters of said TPG modulator are at least to a modulator high-pass cutoff frequency $f_H$ and to a block size of said pattern bitstream and wherein said at least one performance specification of said MUT is a signal-to-quantization noise ratio SQR.

* * * * *